United States Patent [19]

Benson et al.

[11] Patent Number: 6,096,164
[45] Date of Patent: *Aug. 1, 2000

[54] MULTIPLE AXES FIBER PLACEMENT MACHINE

[75] Inventors: Vernon M. Benson, South Jordan, Utah; Dee R. Gill, Manchester, Mich.; James P. Nielsen, West Valley City, Utah; Hosein Mansouri, Salt Lake City, Utah; Noel I. Shepherd, Grantsville, Utah

[73] Assignee: Alliant Techsystems Inc., Hopkins, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 09/135,068

[22] Filed: Aug. 17, 1998

Related U.S. Application Data

[63] Continuation of application No. 08/183,583, Jan. 19, 1994, abandoned, which is a continuation of application No. 07/933,955, Aug. 21, 1992, abandoned, which is a continuation of application No. 07/630,137, Dec. 19, 1990, abandoned.

[51] Int. Cl.[7] ................................................. B65H 81/00
[52] U.S. Cl. ..................... 156/425; 156/429; 156/430; 156/431; 156/433; 156/523; 156/574
[58] Field of Search ............................ 156/80, 166, 169, 156/172, 173, 175, 425, 433, 523, 574, 498, 499, 361, 428, 429–431, 359; 901/29

[56] References Cited

U.S. PATENT DOCUMENTS

| | | |
|---|---|---|
| 3,313,670 | 4/1967 | Sherwood . |
| 3,574,040 | 4/1971 | Chitwood et al. . |
| 3,616,078 | 10/1971 | Howard . |
| 3,723,157 | 3/1973 | Druin . |
| 3,775,219 | 11/1973 | Karlson et al. . |
| 3,810,805 | 5/1974 | Goldsworthy et al. . |
| 3,819,461 | 6/1974 | Saffadi . |
| 3,945,578 | 3/1976 | Kaminsky et al. ................. 242/436 |
| 4,172,562 | 10/1979 | Smith .............................. 156/169 X |
| 4,221,619 | 9/1980 | Lemons . |
| 4,285,752 | 8/1981 | Higgins . |
| 4,288,267 | 9/1981 | McLarty ........................... 156/425 X |
| 4,351,688 | 9/1982 | Weiss et al. . |
| 4,382,836 | 5/1983 | Frank . |
| 4,420,355 | 12/1983 | Saur . |
| 4,508,584 | 4/1985 | Charles . |
| 4,557,790 | 12/1985 | Wisbey . |
| 4,560,433 | 12/1985 | Frank . |
| 4,569,716 | 2/1986 | Pugh . |
| 4,591,402 | 5/1986 | Evans et al. . |
| 4,623,101 | 11/1986 | Cacak .............................. 242/486.7 |
| 4,627,886 | 12/1986 | Grone et al. . |
| 4,699,683 | 10/1987 | McCowin . |

(List continued on next page.)

FOREIGN PATENT DOCUMENTS

| | | |
|---|---|---|
| 0 198 744 | 10/1985 | European Pat. Off. . |
| 0 370 507 | 5/1990 | European Pat. Off. . |
| 0 491 353 | 6/1992 | European Pat. Off. . |
| 2 300 816 | 7/1974 | Germany . |
| 3442261 | 5/1985 | Germany . |

OTHER PUBLICATIONS

Goldsworthy, W. Brandt, "N/C Tape Laying—Tomorrow's Future Today," *Technical Paper*, pp. 1–9, Mar. 1974.

(List continued on next page.)

*Primary Examiner*—Jeff H. Aftergut
*Attorney, Agent, or Firm*—Trask Britt

[57] ABSTRACT

A fiber placement machine undergoes a plurality of axes of motion in locating a delivery head (containing a compaction roller) perpendicular to a mandrel, with relative movement between the head and the mandrel along a predetermined path, which may be over a complex compounded shape. The machine includes a temperature controlled creel where rovings (or tows) of fibrous material are stored on spools and are fed from the creel to the delivery head. The delivery head processes the tows into a band and applies the band on the surface of the mandrel by means of the roller compaction.

7 Claims, 6 Drawing Sheets

U.S. PATENT DOCUMENTS

| | | |
|---|---|---|
| 4,790,898 | 12/1988 | Woods . |
| 4,867,834 | 9/1989 | Alenskis et al. . |
| 4,907,754 | 3/1990 | Vaniglia . |
| 4,909,880 | 3/1990 | Kittelson et al. . |
| 5,022,952 | 6/1991 | Vaniglia . |
| 5,045,147 | 9/1991 | Benson et al. . |
| 5,110,395 | 5/1992 | Vaniglia . |

OTHER PUBLICATIONS

Author Unknown, "Into The Future," *Cincinnati Milacron*, pp. 1–21, undated.

Rosheim, Mark Elling, "A New Pitch–Yaw–Roll Mechanical Robot Wrist Actuator," *Society of Manufacturing Engineers*, vol. 2, Jun. 1985, pp. 15–20 to 15–40.

Author unknown, "Development of Composite Tape Laying Process for Advanced Fibrous Reinforced Composite Structures," General Dynamics Document Control Data • R & D, pp. iclude 2,30–31, 60, 62, 66, 68, 71, 73, 79, 80–81, 139, 144, 146–148, 166–167, 188–190,197–198, 229, 250,265–266, 282–283, 295–296, 307, 333, v–xi, xiii–xxii, Mar. 1971.

Author unknown, "Fiber Placement, The Key Technology for Affordable High Performance Structures," Hercules technical document, Jan. 1990.

Author unknown, "Automated Machinery for Composite Manufacturing," Ingersoll technical documents, pp. 1–7, undated.

Merritt, Rich, "Industrial Robots: Getting Smarter all the . . . ," *Merritt Instruments and Control Systems*, p. 2, Jul. 1982.

Reinhart et al., "Composites," *Engineered Materials Handbook*, vol. 1, pp. 503–518, 1987.

Author unknown, "Fiber Placement: Automating Complex Composite Parts Processing," pp. 1–2, Jun. 1989.

Rosato et al., "Filament Winding: Its Development, Manufacture, Applications, and Design," pp. 103–109.

Evans et al., "Fiber Placement Process Study," pp. 1822–1833, May 8–11, 1989.

MULTIPLE AXES FIBER PLACEMENT MACHINE

RELATED APPLICATION

This application is a continuation of application Ser. No. 08/183,583, filed on Jan. 19, 1994, now abandoned, which is a continuation of application Ser. No. 07/933,955, filed Aug. 21, 1992, now abandoned, which is a continuation of Ser. No. 07/630,137, filed Dec. 19, 1990, now abandoned.

BACKGROUND OF THE INVENTION

1. Field of the Invention

The invention relates to fiber placement machines that use multiple strands or tows (or rovings) of fiber that are pulled from a creel assembly and placed on a surface of a workpiece.

2. State of the Art

Filament winding was one of the early attempts at automating the laying down of composites on forms. Early filament winding machines consisted of a spindle axis which rotated a mandrel, whose outer shape and dimensions are the same as the shape and internal dimensions of the part to be wound. A carriage axis moved in a direction parallel to the spindle. A cross slide was mounted on the carriage providing movement perpendicular to the spindle axis and the carriage axis. An eye, or circular opening, was mounted to the end of the cross slide and was rotatable about an axis parallel to the cross slide axis. Tows made up of filaments of fiber glass, Kevlar™ polyamide material, or carbon were transported from spools located in a creel, through a cup of liquid resin and wound under tension onto the mandrel.

In filament winding, the winding is started by attaching the roving to the mandrel and rotating the mandrel while moving the carriage longitudinally to the axis of the mandrel. The angle of winding is determined by the relative speed of rotation of the mandrel and the linear motion of the carriage. The angle has to be maintained during lay down in one direction of motion of the carriage slide. When the carriage reaches the opposite end of the mandrel, it reverses direction. Two means are used to keep the tows from sliding off the mandrel when the longitudinal direction is reversed. The first method is used for structures having domed ends. In this case, the mandrel is rotated through a relatively large angle as the tow is placed on the dome. The fiber path essentially runs tangent to the mandrel support rod. As the tow passes the tangency point, the carriage is reversed. As layers are added to the lay down, the wall thickness of the domed ends increases to a maximum at the tangent point. The second method uses a pin ring made up of several small pins located around the periphery of the mandrel ends. The tows are held in the spaces between the pins.

Early filament winding machines controlled the angle through a mechanical cam or gearing arrangement. As computer controls became viable, the movements of the various axes were controlled by a computer program, which runs on a computer numerical control (CNC).

Filament winding is limited to shapes that are nearly cylindrical with the filaments following geodesic paths. A geodesic path is a path of a material over a form, said path being selected to reduce most structural stresses to tensions that allow the material to lie in place on the form congenially without tending to move from its placid position.

Tape laying is a more recent attempt to automate the lay down of composites on mandrels. In this process, prepreg composite tapes are fed from a reel to a delivery roller and compacted onto the mandrel or onto previous layers of prepreg tape. The tape usually has a paper or similar backing to keep the roll of tape from adhering to itself. A limitation of this process is that the tape path must follow a geodesic path in order to keep from buckling. The tape is cut at the end of each pass. The tape remains in place after cutting by means of the tackiness of the preimpregnation. In most cases, tape laying forms or molds are stationary and nearly flat. Tape laying is limited to geodesic paths across surfaces.

Fiber placement, although related to both filament winding and tape laying processes, is more versatile than either of them because it may be used to lay down tows of fiber on flat or symmetrical shapes as well as on complex compound contours that previously required manual darting and fitting of the material onto the shape. It uses a compaction roller like tape laying, but uses material in the form of prepreg tows instead of tape. It forms its own tape or band from the tows. The reason that fiber placement can move on non-geodesic paths is that each tow can feed at a different rate, allowing the outside tow on a curve to feed more rapidly than the inside tow. The tows between the inside and outside tows feed at progressively faster rates from the inside to the outside, thus permitting the steering of the fiber into curved or non-geodesic paths.

Previous fiber placement machines provided no means of processing the tows into flat ribbons or of controlling the temperature of the tows being processed. Flattening of the tows was performed solely by the compaction roller pressure as the tows were compacted against the mandrel.

Tows for fiber placement may be impregnated with either thermosetting resins or thermoplastic resins. Thermosetting resins cure over a given period of time, depending on the temperature of their environment. Elevating the temperature speeds the rate of cure, while lowering the temperature decreases rate of cure, even to the extent of stopping the cure altogether at lower temperatures. Most thermosetting prepreg tows will gradually cure at room temperature. Curing renders the tows stiff and brittle, making fiber placement difficult or impossible. On the other hand, thermoplastic resins do not cure at any temperature but soften at elevated temperatures and stiffen at lower temperature to the point of becoming solid. Some of these thermoplastic resins can repeatedly be heated to soften and cooled to stiffen. Contrary to this, thermosetting resins once reheated above their softening point will degrade and carbonize rather than re-soften.

Prepreg tows have the property of tackiness, which allows separate tows to adhere to each other or to a mandrel, thus providing a means of building up various solid shapes by layers. Tackiness of tows is affected by the temperature of the tows, increasing with increased temperature, when using thermoplastic resins or before thermosetting resins become completely cured. High tackiness, during processing, is undesirable before the tows reach the compaction roller, because tacky resins adhere to the components of the delivery head with which they contact. Build up of resin on the delivery heads detracts from the functions of the delivery heads.

U.S. Pat. No. 4,943,338 discloses a fiber placement machine that has a delivery head for controlling fiber tows coming from a supply creel to a work lay down zone. This machine travels on an overhead gantry structure for positioning and delivering the tows to the workpiece with the help of a computer numerical control (CNC) for controlling the actual spatial positioning and manipulation of the head.

BRIEF SUMMARY OF THE INVENTION

This invention is directed to a fiber placement machine for laying tows of fiber on flat, geodesic, or complex compound shape forms comprising:

a) a mandrel for holding a flat, geodesic, or complex compound shape form mounted about its center axis, b) a delivery head positioned adjacent to the mandrel and attached to a wrist that is attached to an arm in such a way that the delivery head can move in an up and down motion, a side-to-side motion, and a rotating motion about the center axis of the arm, and has the ability to cut individual tows or bands of tows via cutting means, and subsequently to add the tows or bands back into the laying down process via adding means and means for controlling the temperature in the tows at a predetermined level, c) a ribbonizing means for forming a band of tows into desired shapes, d) a fiber supply creel including a plurality of spools of fiber mounted to the machine, the creel having means for enclosing the plurality of spools, means for controlling the temperature of the spools, and means for maintaining tension on the fibers, e) the arm is attached to a base so as to be able to better position the head relative to the mandrel, f) the base on which the arm is attached sits on a slide that moves the arm in a direction perpendicular towards and away from the mandrel, g) the slide sits on a carriage that moves the arm via ways in a direction parallel to the center axis of the mandrel to cover the surface of the entire mandrel, and h) control means for driving the component parts of this machine in order to assure that the delivery head is positioned in the proper place at all times for laying tows of fiber either individually or as a band on the mandrel.

This invention also includes a method of placing fiber on a mandrel to produce a flat, geodesic, or complex compounded shaped article using the above-mentioned fiber placement machine.

DETAILED DESCRIPTION OF THE INVENTION

This invention is a completely computerized system for laying down composites on mandrels that are not necessarily geodesic or flat but rather have complex compound designs; these complex compound designs can have a wide variety of shapes, such as concave sides, convex sides, truncated sides, uneven sides, and combinations of intricately detailed shapes.

On the fiber placement machine of the instant invention, one or a plurality of tows can be processed into a band or tape for compaction on a mandrel in a manner similar to that employed by tape laying machines. Since the band or tape is made up of a plurality of tows, the tows can be fed to the delivery head at different rates, allowing the band to be placed on a curved path without significant buckling. This feature makes it possible to lay down composites on a wide variety of mandrel shapes as mentioned above. The mandrel can be either stationary or rotated, depending on the nature of the workpiece. In the fiber placement process of the instant invention, by way of example, graphite carbon fiber tows are normally impregnated with a resin prior to using in the process. Hence, the temperature of the tows should be controlled during the process in order to keep the tackiness down and, more importantly, to stop the resin in the tows from advancing to a state of cure in the fiber placement equipment. Therefore, it is important to control the temperature of the tows during the placement process. The creel temperature is normally kept low but can vary in the range of $-20°$ to $+35°$ C. in order to keep the prepreg tows from partially curing. This temperature range can vary, depending upon what resin system is being used to impregnate the tows. The temperature of the tows during ribbonizing is raised in order to help in the shaping and forming into a band (or tape) of the tows; in this ribbonizing zone, the temperature should be maintained in the temperature range of $88°$ to $163°$ C. for best results, again depending upon the resin system being used. The temperature of the tows in the delivery head (excluding the ribbonizing section when present) is reduced (to a temperature of $-25°$ to $+10°$ C.) for the purpose of keeping the resin in the tows from effusing out of and off the surface of tows onto the contact surfaces of the components of the delivery head. The temperature, nevertheless, of the tows at the nip point or compaction roller may be raised to improve the tows tackiness so as to obtain better adherence of the tows' to the mandrel or to the previously laid down layer of the composites.

For a more detailed and comprehensive illustration of the invention, the invention will be described in reference to the drawings.

Figure 1:
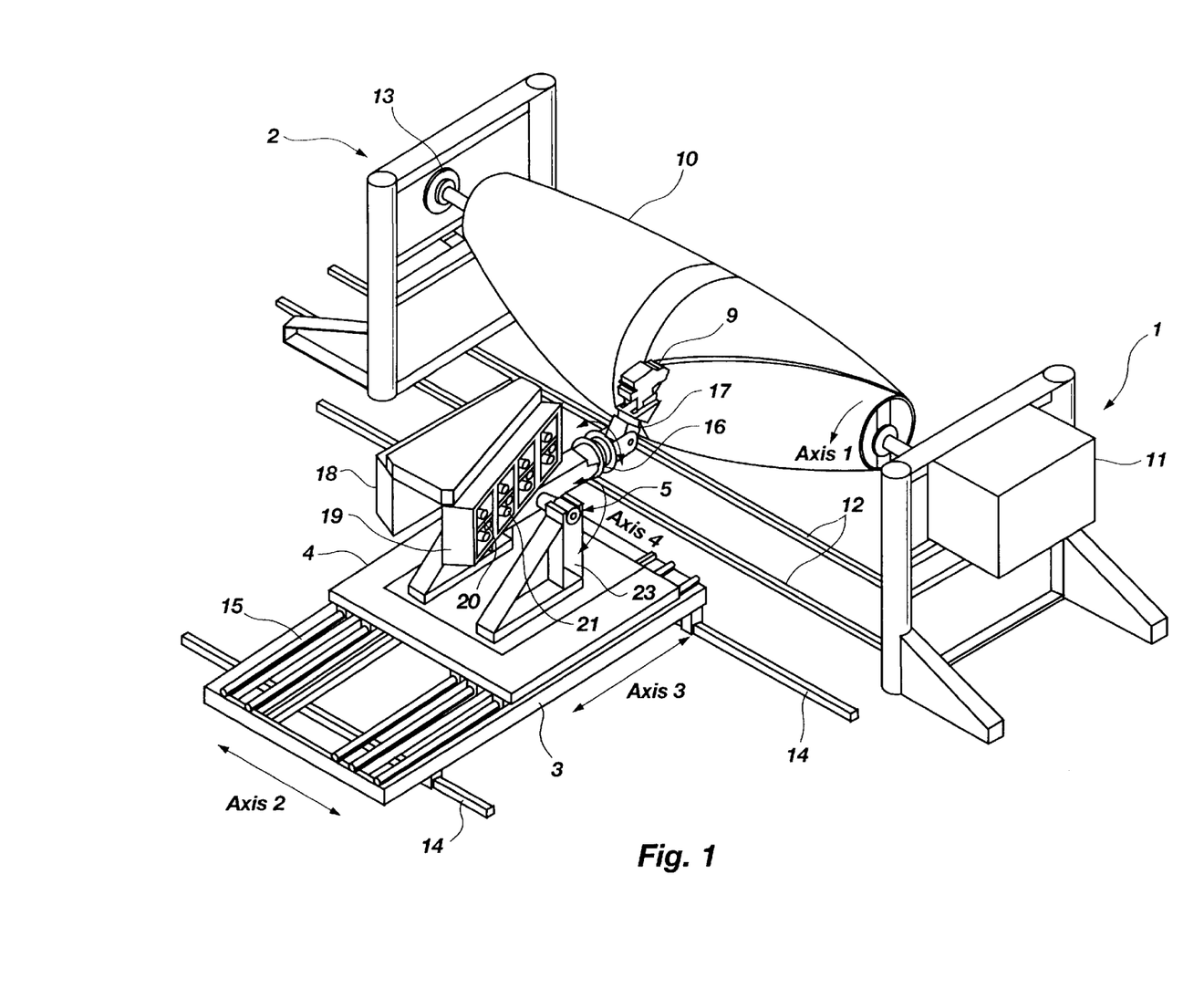
FIG. 1 is a perspective view of the fiber placement machine of the instant invention.
Figure 4:
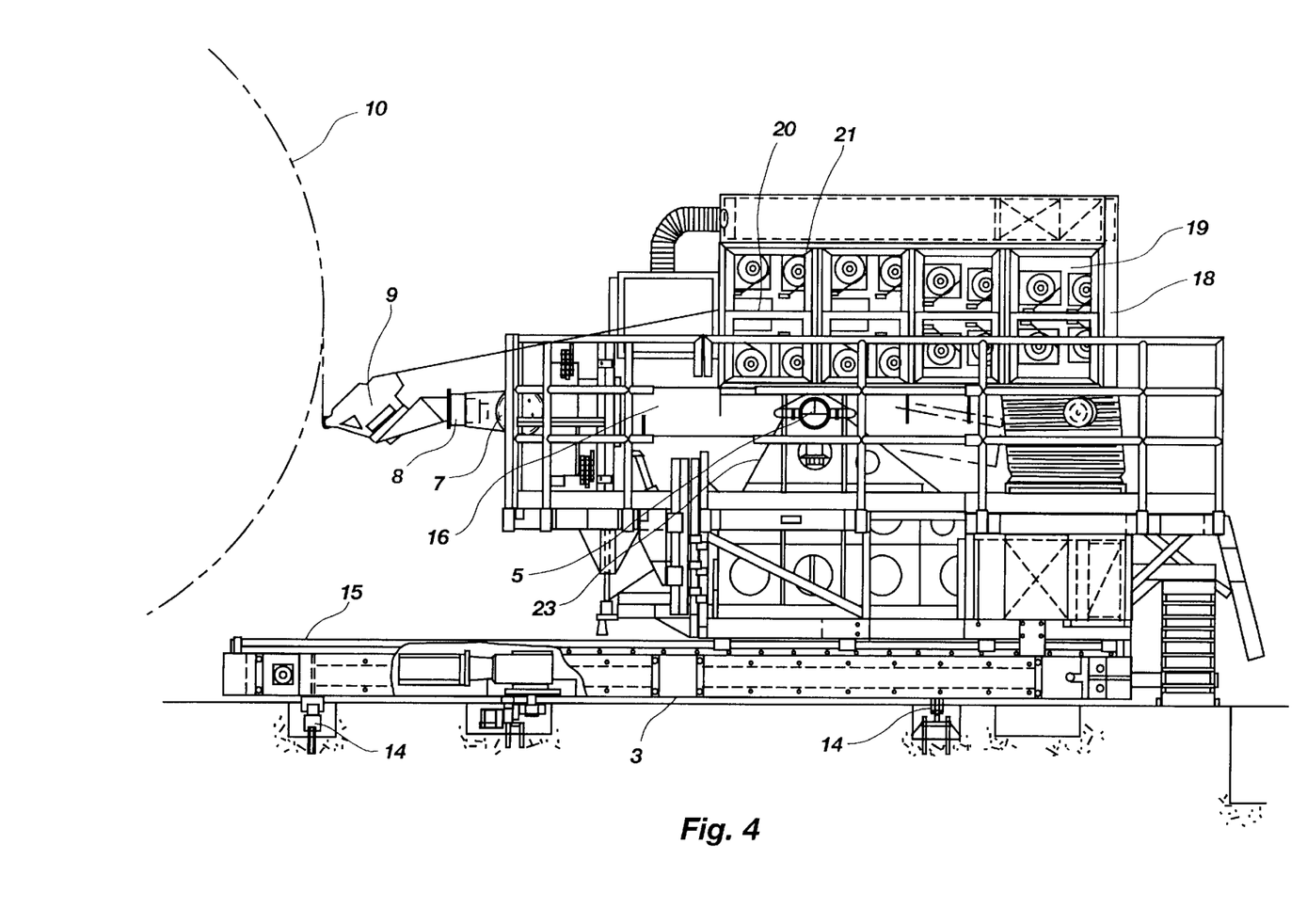
FIG. 4 is a side elevational view of the fiber placement machine showing the path of the tows from the creel to the compaction roller.

FIGS. 1 and 4 illustrate the preferred embodiment of the invention. The fiber placement machine comprises headstock 1 and tailstock 2, fixed to the floor of the building or to a machine bed (not shown). The headstock 1 contains a means of rotation 11 to rotate a mandrel 10 about an axis running through headstock 1 and tailstock 2 and parallel to ways 12. The rotation is accurately controlled so as to be able to rotate mandrel 10 in small increments. The tailstock 2 and headstock 1 are mounted on linear ways 12 (attached to the floor of the building) which are parallel to the axis between the headstock 1 and tailstock 2. The tailstock 2 contains a rotational bearing 13 which is located on the same centerline as the headstock spindle. The tailstock 2 can be moved along its ways so as to adjust the distance between the headstock 1 and the tailstock 2 in order to accommodate mandrels of varying lengths. Mandrel 10 is attached to the headstock 1 and the tailstock 2 so as to be rotatable about axis 1. Mandrel 10 is removably attached so that mandrels of varying shapes and sizes can be utilized depending upon the article to be manufactured.

Figure 5:
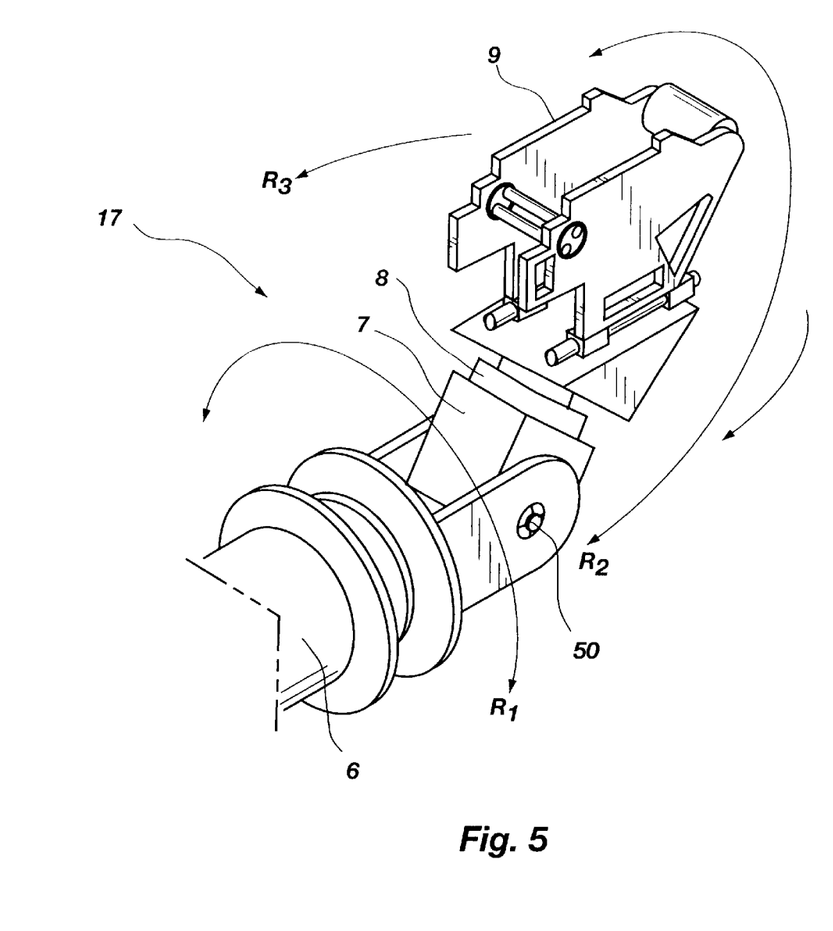
FIG. 5 is a close-up view of the arm, wrist and delivery head of the fiber placement machine.

The carriage 3 is mounted on ways 14 attached to the floor of the building so as to be moveable in a direction parallel to axis 1 and ways 12 attached to the floor of the building. This movement is labeled axis 2. A cross slide 4 having a first end portion, a center portion, and a second end portion is mounted on ways 15 which are fixed to carriage 3 in a direction perpendicular to ways 12 and 14. The movement of the cross slide 4 on the carriage 3 is labeled axis 3 and enables a more accurate spotting of delivery head 9 at all times during the laying down process. A trunnion 5 is mounted on a base 23 that is mounted to substantially the center portion of the cross slide 4 with the trunnion's axis of rotation parallel to ways 14. The purpose of the trunnion 5 is to provide vertical motion to the delivery head 9 for complex movements of the head. An arm 16 having a first portion having an end and a second portion having an end is attached to the trunnion extending in a direction perpendicular to the trunnion axis (axis 4). A robotic wrist 17 is mounted to the end of the first portion of the arm 16 as shown in FIG. 5. The wrist 17 provides the means of positioning the delivery head 9 in any position nearly perpendicular to the surface of mandrel 10. Any of several robotic wrist configurations can perform this function. The wrist shown here in FIG. 5 has three motions. Motion R1 is provided by a gearmotor 6 which provides rotation about an axis which is essentially the same as the centerline of arm 16 or parallel to the arm centerline. Motion R2 is provided by gearmotor 7, and is a rotation about an axis of trunnion 50. Motion R3 is provided by gearmotor 8, and is a rotating motion about an axis perpendicular to the axis of R2.

A creel 18 normally is attached to a portion of the first portion and the second portion of the arm 16 in such a way that it moves with the carriage 3 and/or the cross slide 4 and/or the trunnion 50. It is also possible for the creel 18 to be attached to a separate carriage or another part of the machine. The preferred embodiment shows the creel 18 is enclosed by cabinet 19 which has doors 20 for entering the cabinet 19 to service spindles 21. In the preferred embodiment, as illustrated in drawing FIGS. 1 and 4, the creel 18 is mounted on a portion of the arm 16 having a portion of the mounting locations for spools of fiber on spindles 21 supported by the first portion of the arm 16 and having a portion of the mounting location for spools of fiber on spindles 21 supported by the second portion of the arm 16 with portions of the creel 18 being located on each side of the arm 16 and extending beyond the end of the second portion of the arm 16. Enclosing the creel 18 allows the temperature of the creel 18 to be controlled by cooling or heating means (not shown). Spools containing fibrous tows are attached to the creel spindles 21, and the tows are threaded through a series of redirects (not shown) out of the creel 18 to the delivery head 9. In the embodiment of FIGS. 1 and 4, the arm 16 supports the fiber creel 18 at a position so that the fiber spools, or creel 18, are readily accessible to machine support personnel for the purpose of maintaining the integrity of the fiber system and/or reloading the creel 18. The spools containing fibrous tows are rotatable around horizontal shafts or spindles 21, extending outwardly from both sides of the creel 18 through a series of redirects, parallel to the arm 16. The spindles 21 are motorized and held in bearings and driven by a torque motor (not illustrated) so that the fiber or filaments may be pulled from the creel 18 with a predetermined amount of fiber tension; and when slack occurs in the line of fiber, the torque motor will back-drive to take up the slack.

Figure 2:
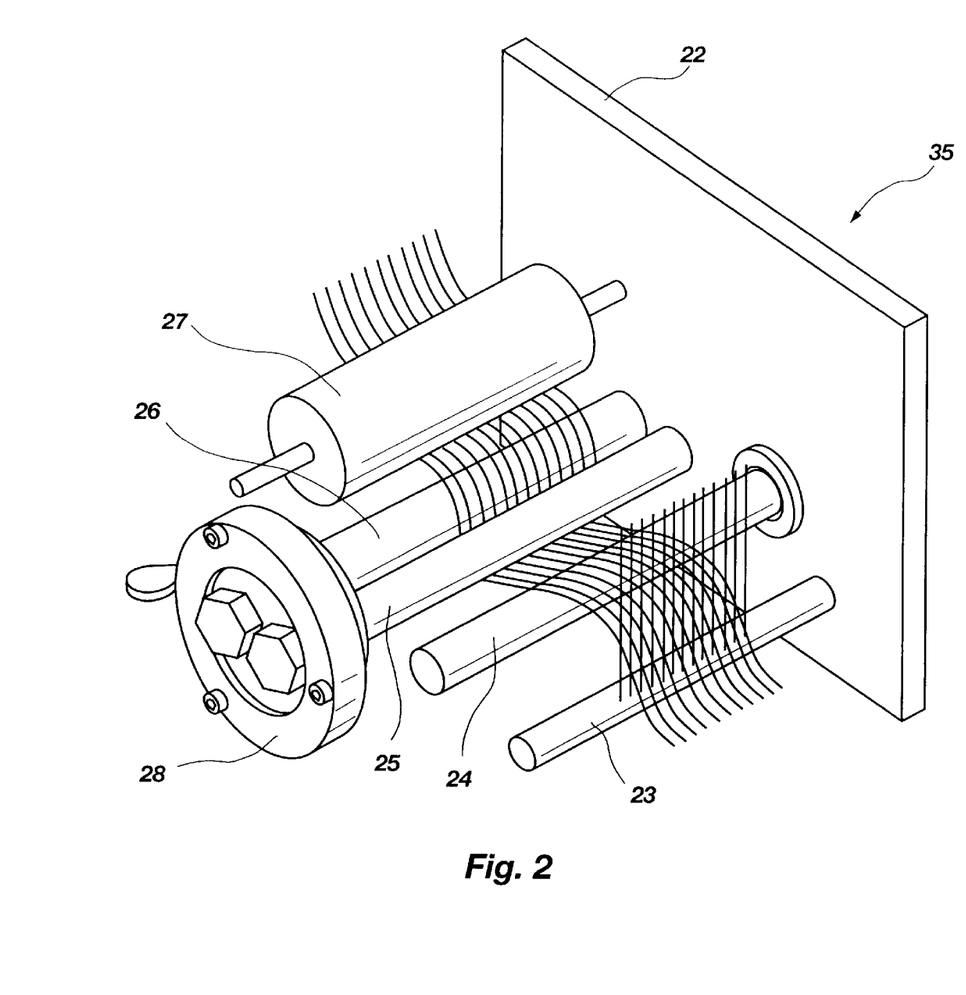
FIG. 2 is a cut-away view of the ribbonizer.

FIG. 2 shows a device 35. Mounting plate 22 may be a plate located in the delivery head 9 or elsewhere on the fiber path between the creel 18 and the delivery head 9. In other words, it is not always necessary or desirable to have the ribbonizing device in the delivery head. In practice another mounting plate parallel to mounting plate 22 is used to provide additional support and stability to the mechanism. A spreading device, represented here by a comb 23, separates the tows from each other and provides the spacing desired. Tows coming from creel 18 are passed through the comb 23. After passing through the comb 23, the tows make contact with spreader bars 24, 25, and 26 in a serpentine arrangement (or an s curve path). The spreader bars are heated internally. The tows contact the bars going over bar 24, under bar 25, and over bar 26 in a serpentine path. The angle of contact between the tows and the spreader bars can be adjusted by rotation of holder 28. Although not shown in the drawings, the adjustments of bars 25 and 26 can be achieved by keeping bar 26 stationary and moving bar 25 in a vertical path so as to change the angle of contact between the tows and bars 24, 25 and 26. As the tows pass over the bars 24, 25, and 26, they are spread and flattened to a wide thin ribbon by the heat and tension on the tows, depending upon the desired shape of the tows. Adjustment of temperature and the angle of contact between the tows and the bars 24, 25, and 26 cause the width and thickness of the ribbon to change. After being spread into a ribbon, the tows pass over a cooling bar 27. The cooling bar cools the tows into a stiffened ribbon as they come from the spreader bars. Cooling of the tows also facilitates movement of the tows through the head, without depositing excessive resin on the contact surfaces of the head.

Figure 3:
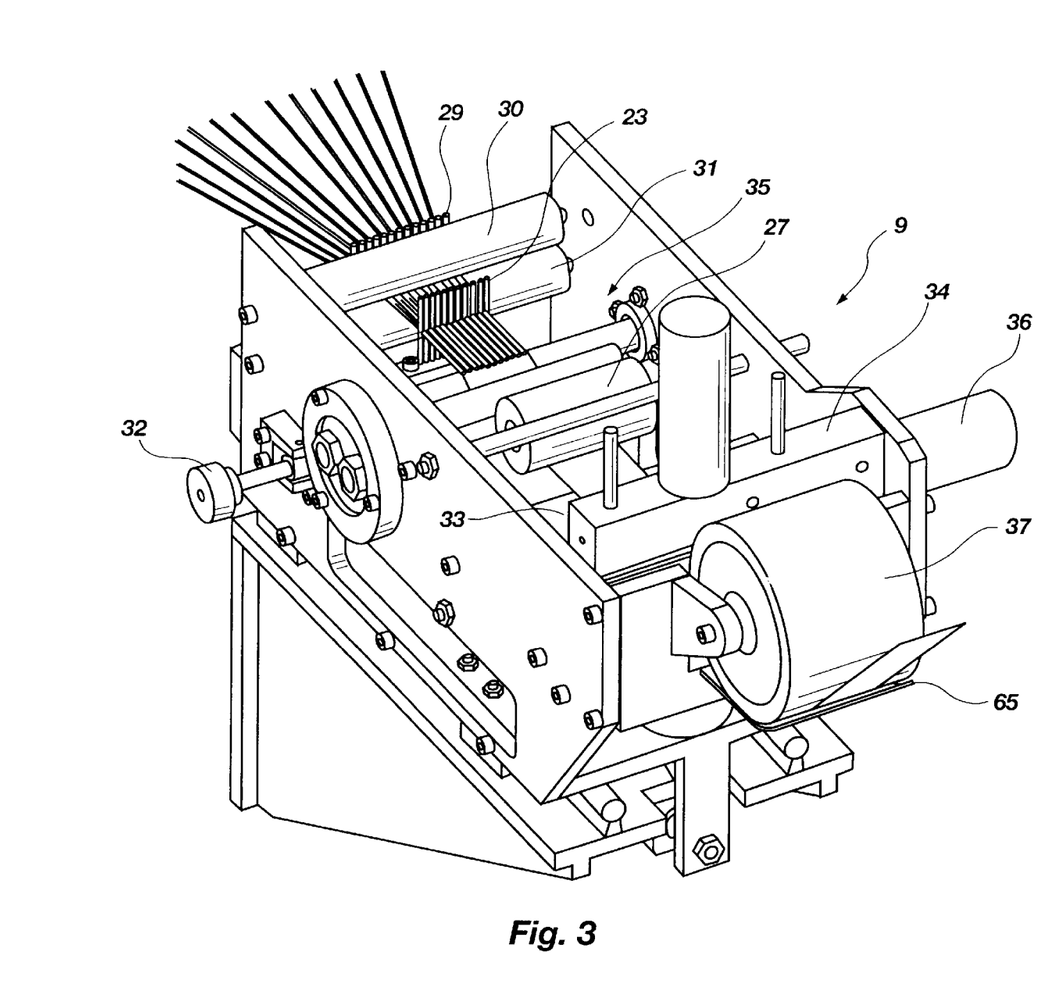
FIG. 3 is a perspective view of a fiber placement delivery head of the present invention.

FIG. 3 shows an embodiment of a delivery head for use in the instant invention. Comb 29 is used to keep the tows separated from each other. After passing through comb 29, the tows pass between rollers 30 and 31, which determine the plane in which the tows are introduced into the delivery head 9. After passing between rollers 30 and 31, the tows pass through another comb 23. Comb 23 is rotatable about an axis parallel to the tines of the comb. The rotation is accomplished by turning knob 32. As comb 23 rotates, the distance between tows varies. After passing through comb 23, the tows pass through ribbonizing device 35 and over cooling rod 27. Motor 36 rotates add rollers 33. After the band of tows is cut by cutter 34, the band remaining in the head is fed between rollers 33 back to compaction roller 37. Cutter 34 may be guillotine type, anvil type, or any other device for cutting a band of composite material. The bank of tows then passes between compaction roller 37 and mandrel 10. The pressure of the compaction roller causes the band to adhere to mandrel 10, or a previously placed layer of composite material. The temperature of the band may be raised as it passes beneath the compaction roller, in order to increase its tackiness, thereby causing it to adhere better. This heat may be provided by a direct contact hot air gun, laser, ultrasonic, or other heat source such as a heated compaction roller.

Other heads may be used such as those disclosed in U.S. Pat. No. 4,867,834, U.S. Pat. No. 5,045,147 or U.S. patent application Ser. No. 07/630,083 of B. Hatch and K. Shup, filed Dec. 19, 1990. These heads have the added feature of being able to cut and add individual tows, thus varying the width of the band being placed on the mandrel 10. Since the ribbonizing device 35 can be separate from the delivery head, this invention can also use delivery heads such as the one described in U.S. Pat. No. 4,699,683; this head does not have the versatility of the heads mentioned above because of the lack of heat control and bulkiness of the head but, nevertheless, can be used in limited situations.

Figure 6:
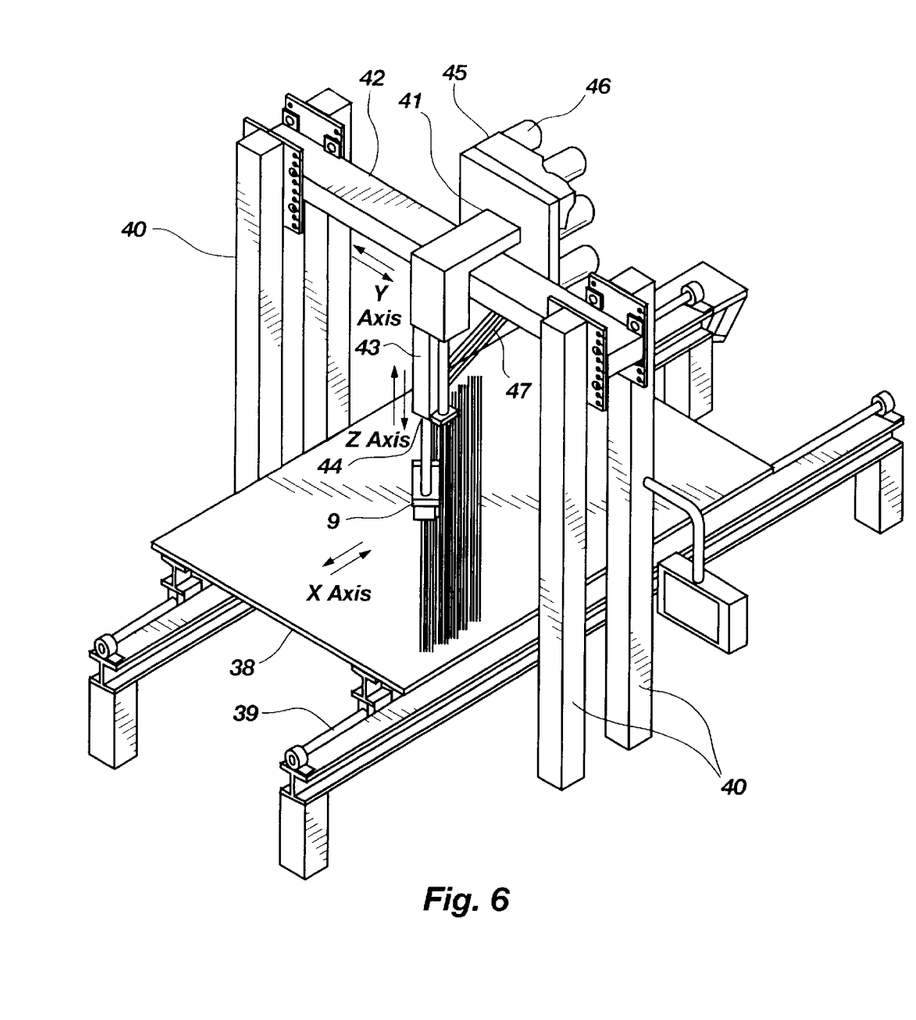
FIG. 6 is a perspective view of an alternate embodiment of the instant invention.

FIG. 6 is an illustration of an alternate embodiment of the machine. Any of several methods may be used to position the delivery head relative to the mandrel. In this embodiment, the mandrel is not rotating, and is positioned on a table 38. In this embodiment, the table is itself being used as a mandrel for a flat part. The table is mounted on ways 39 and is movable in a linear direction, here labeled X axis. Two sets of columns 40, located on either side of the machine, support a cross slide 41 which slides on ways 42.

The movement of the cross slide is perpendicular to the X axis and located somewhat above table 38, and is labeled Y axis. A vertical linear slide 43 is mounted on cross slide 41.

Vertical linear slide 43 provides movement perpendicular to the plane of the table 38, and is labeled Z axis. The delivery head 9 is attached to the end of the rotational axis 44. This arrangement is suitable for laying flat surfaces. For mandrels which are not flat, rotational axis 44 would be replaced with a three-axis robotic wrist, which could be of similar design as the wrist described above and illustrated in FIG. 5. The creel 45 is shown here mounted on the cross slide 41 and is enclosed; in FIG. 5, the creel housing has been cut-away to show the spools of fibrous material. The creel housing is necessary for controlling the temperature of the tows. It should be noted that the placement of the creel 45 is not critical and could be located in several other positions. Spools of tows 46 are shown in the creel 45. These spools are mounted on a series of spindles (not shown). Tows 47 are shown moving from the creel 45 to the delivery head 9. As mentioned above, the spools of tows 46 are pulled from the creel 45 at a predetermined speed via a torque motor, which also takes up any slack in the line of fiber by reversing itself when needed.

What is claimed is:

1. A fiber placement machine for laying down tows fiber on the shaped form of a mandrel, said fiber placement machine located on a floor, said fiber placement machine comprising:

a first plurality of linear ways having an axis, said first plurality of linear ways attached to said floor;

a headstock mounted on a portion of said first plurality of linear ways, said headstock including rotation apparatus for rotating said mandrel about an axis thereof and a spindle connected to the rotation apparatus and to a portion of said mandrel, the spindle having a central rotation axis, the central rotation axis of the spindle being parallel to the axis of the first plurality of linear ways;

a tailstock movably mounted on another portion of the first plurality of linear ways, the tailstock including a rotational bearing having a central rotation axis thereof located on substantially the same central rotation axis of the spindle of the headstock, the tailstock connected to a portion of said mandrel, the central rotation axis of the rotational bearing being parallel to the axis of the first plurality of linear ways;

a second plurality of ways having an axis extending substantially parallel to the first plurality of ways, said second plurality of ways attached directly to said floor;

a carriage movably mounted on the second plurality of ways, the carriage movable in a direction substantially parallel to the first plurality of linear ways;

a third plurality of ways mounted on the carriage, extending thereabove, and substantially perpendicular to the first plurality of linear ways and the second plurality of ways;

a cross slide mounted on and extending above the third plurality of ways and movably connected thereto, the cross slide movable towards and away from said mandrel in a direction substantially perpendicular to an axis thereof extending through the central rotation axis of the spindle of the headstock and the central rotation axis of the rotation bearing of said tailstock, said cross slide having a first end portion, a center portion, and a second end portion;

a base mounted above the cross slide in substantially the center portion of the cross slide and connected thereto, the base having a top portion and a bottom portion, the bottom portion mounted above the cross slide in the center portion of the cross slide;

trunnion apparatus mounted on a portion of the top portion of the cross slide and rotatably connected thereto of the base mounted above the cross slide, the trunnion apparatus having an axis of rotation substantially parallel to the first plurality of linear ways and the second plurality of ways;

an arm attached to the trunnion apparatus in a position which varies with respect to the distance between the axis of rotation of the trunnion apparatus and the central rotation axis of the spindle of the headstock and the central rotation axis of the rotational bearing of the tailstock, the arm having two sides and having an axis extending substantially perpendicular to the axis of rotation of the trunnion apparatus and rotatable thereabout, the arm having a first portion having an end and a second portion having an end, the first portion of the arm extending from the trunnion apparatus towards said mandrel terminating in an end thereof, the first portion of the arm extending from the trunnion apparatus towards said mandrel having a rotational axis, the second portion of the arm extending away from the trunnion apparatus;

robotic wrist connected to the end of the first portion of the arm extending from the trunnion apparatus towards said mandrel, the robotic wrist having a rotational motion substantially about the rotation axis of the first portion of the arm extending from the trunnion apparatus towards said mandrel, having a rotational motion substantially about the axis of rotation of the trunnion apparatus, and a rotation motion about an axis substantially perpendicular to the axis of rotation of the trunnion apparatus;

a delivery head attached to the robotic wrist movable towards and away from said mandrel, movable in an up and down motion with the portion of the arm attached to the trunnion apparatus extending towards said mandrel, movable about the rotational axis of the first portion of the arm extending from the trunnion apparatus towards said mandrel, movable about the axis of rotation of the trunnion apparatus, and movable about an axis substantially perpendicular to the axis of rotation of the trunnion apparatus, the delivery head having a plurality of zones therein which said tows of said fiber pass therethrough, the delivery head having temperature control apparatus for controlling the temperature of said tows while passing through the plurality of zones, the delivery head including a plurality of spreader bars located therein in a serpentine arrangement in a holder, each spreader bar of the plurality of spreader bars being internally heated, the angle of contact of a tow of said tows with said each spreader bar of the plurality of spreader bars being variable by the rotation of the holder, the delivery head having a cooling bar located after the plurality of spreader bars for the cooling of a tow of said tows after the contact thereof with the plurality of spreader bars;

a fiber supply creel assemble having a plurality of mounting locations for spools of fiber therein, said fiber supply creel assembly attached to a portion of the arm having a portion of the mounting locations for spools of fiber of said fiber creel assembly attached to and supported by the first portion of the arm and having a portion of the mounting locations for fiber of said fiber creel assembly attached to and supported by the second portion of the arm, the fiber supply creel assembly having a side located on each side of the arm, the fiber supply creel including:
- a plurality of spindles, each spindle of the plurality of spindles driven by a motor and held in bearings, said seach spindle of the plurality of spindles driven for a filament of fiber from a spool of fiber to be pulled therefrom with a predetermined amount of fiber tension and for taking up slack in the filament of fiber of a spool of fiber;
- a plurality of spools of fiber mounted on the plurality of spindles, said each spool of the plurality of spools of fiber having a filament of fiber thereon, said each spindle of the plurality of spindles being motorized and held in bearings, said each spindle of the plurality of spindles driven for a filament of fiber from a spool of fiber of the plurality of spools of fiber to be pulled therefrom with a predetermined amount of fiber tension and for taking up slack in the filament of fiber of said spool of fiber of the plurality of spools of fiber; and
- an enclosed cabinet enclosing therein the plurality of spindles and the plurality of spools of fiber, said cabinet having a plurality of doors therein for the access of the plurality of spools of fiber mounted on the plurality of spindles, said cabinet having a first portion supported by the first portion of the arm and having a second portion supported by the second portion of the arm, the second portion of the cabinet extending beyond the end of the second portion of the arm having a plurality of the plurality of spindles located beyond the end of the second portion of the arm; and
- control apparatus for said machine for controlling the positioning of said delivery head for said laying of said tows of fiber.

2. The fiber placement machine of claim 1, wherein each spindle of the plurality of spindles extends outwardly from a side of the two sides of the fiber creel assembly.

3. The fiber placement machine of claim 1, wherein the fiber creel assembly includes a temperature controlled fiber creel assembly for maintaining the temperature within the cabinet in the range of −25° C. to +10° C.

4. The fiber placement machine of claim 1, further comprising:
- a ribbonizing apparatus including the plurality of heated spreader bars in the delivery head for forming a band of tows into a desired shape.

5. The fiber placement machine of claim 4, wherein the ribbonizing apparatus includes a plurality of ribbonizing zones maintained at a temperature in the range of 88° C. to 163° C.

6. The fiber placement machine of claim 5, wherein the delivery head further includes:
- cutting apparatus for the cutting of said tows;
- adding apparatus to add said tows; and
- temperature control apparatus for the controlling of temperature of said tows in the plurality of zones of the delivery head at different temperatures.

7. The fiber placement machine of claim 6, wherein the delivery head maintains the temperature of said tows in some zones of the plurality of zones in the delivery head in the range of −25° C. to +10° C. except for the plurality of ribbonizing zones of the heated spreader bars.

* * * * *

UNITED STATES PATENT AND TRADEMARK OFFICE
CERTIFICATE OF CORRECTION

PATENT NO.    : 6,096,164
DATED         : August 1, 2000
INVENTOR(S)   : Vernon M. Benson et al.

It is certified that error appears in the above-identified patent and that said Letters Patent is hereby corrected as shown below:

Drawings,
Delete Sheet 2 and substitute therefore the drawing sheet consisting of FIG. 1. on the attached page Column 1,
Line 29, change "fiber glass," to -- fiberglass, --

Column 5,
Line 2, change "23" to -- 22 --
Line 15, change "RI" to -- R1 --
Line 25, change "50" to -- 5 --
Line 61, insert a comma after "practice"

Column 7,
Line 25, after "tows" and before "fiber" insert -- of --
Line 26, before "shaped" change "the" to -- a --
Line 48, after "of" and before "ways" insert -- linear --

Column 8,
Line 60, change "assemble" to -- assembly --
Line 61, after "of" and before "fiber" insert -- said --
Line 63, change "spools of" to -- said spools of said --
Line 66, after "for" and before "fiber" insert -- said --

Column 9,
Line 7, change "seach" to -- each --

UNITED STATES PATENT AND TRADEMARK OFFICE
CERTIFICATE OF CORRECTION

PATENT NO.   : 6,096,164
DATED        : August 1, 2000
INVENTOR(S)  : Vernon M. Benson et al.

It is certified that error appears in the above-identified patent and that said Letters Patent is hereby corrected as shown below:

Column 10,
Line 4, before "each" insert -- said --
Line 22, before "cutting" delete "the"

Signed and Sealed this

Twenty-seventh Day of May, 2003

JAMES E. ROGAN
*Director of the United States Patent and Trademark Office*

Fig. 1